US010099236B1

(12) United States Patent
Xie (10) Patent No.: US 10,099,236 B1
(45) Date of Patent: Oct. 16, 2018

(54) APPARATUS AND METHOD FOR SPRAYING COLOR INTO CRACKS OF A MOVING FORMED QUARTZ SLAB TO CREATE VEINS IN AN ENGINEERED STONE (71) Applicant: Alex Xie, West Windsor, NJ (US)

(72) Inventor: Alex Xie, West Windsor, NJ (US)

(*) Notice: Subject to any disclaimer, the term of this patent is extended or adjusted under 35 U.S.C. 154(b) by 1 day.

(21) Appl. No.: 15/860,328

(22) Filed: Jan. 2, 2018

(51) Int. Cl.
| B05C 21/00 | (2006.01) |
| B05B 12/02 | (2006.01) |
| B05B 1/20 | (2006.01) |
| B05D 5/06 | (2006.01) |
| B05D 3/12 | (2006.01) |
| B05D 1/02 | (2006.01) |
| C04B 41/45 | (2006.01) |
| B05C 9/10 | (2006.01) |
| B05C 13/02 | (2006.01) |
| B29C 39/20 | (2006.01) |

(52) U.S. Cl.
CPC .............. B05B 12/02 (2013.01); B05B 1/20 (2013.01); B05C 9/10 (2013.01); B05C 13/02 (2013.01); B05D 1/02 (2013.01); B05D 3/12 (2013.01); B05D 5/061 (2013.01); C04B 41/45 (2013.01); C04B 41/4574 (2013.01); B29C 39/20 (2013.01); C04B 41/4576 (2013.01)

(58) Field of Classification Search
CPC .. B05B 12/02; B05B 1/20; B05C 9/08; B05C 9/10; B05C 13/00; B05C 13/02; C04B 41/45; C04B 41/4574; C04B 41/4576; B28B 3/08; B28B 3/12; B29C 39/44; B29C 39/04; B29C 39/06; B29C 39/24; B29C 39/20; B29C 41/32; Y10T 428/24612; Y10T 428/2462; B44F 9/04; B65G 47/82; B65G 47/54; B65G 47/66; B65G 47/643
USPC .......... 118/313, 315; 428/15; 264/245, 246, 264/295; 198/468.8, 361, 600, 463.3
See application file for complete search history.

(56) References Cited

U.S. PATENT DOCUMENTS

| 1,597,103 A | 8/1926 | Oberherr |
| 1,735,674 A | 11/1929 | Copeland |
| 1,935,985 A | 11/1933 | Oberherr |
| 1,949,517 A | 3/1934 | Van Der Pyl |
| 2,044,585 A | 6/1936 | Macht |
| 2,140,197 A | 12/1938 | Batcheller |
| 3,088,713 A | 5/1963 | Gard |

(Continued)

FOREIGN PATENT DOCUMENTS

| CN | 204842049 U | * 12/2015 |
| FR | 002627424 A1 | 8/1989 |

Primary Examiner — Laura Edwards
(74) Attorney, Agent, or Firm — Walter J. Tencza, Jr.

(57) ABSTRACT

An apparatus including a device which moves a first portion of a soft, damp, and/or wet slab out of alignment with a majority of the slab and thus introduces a first crack in the slab; and a device for spraying a first colored material into the first crack of the slab. The device which moves the first portion of the slab out of alignment with the rest of the slab may include a first lift bar. The device for spraying the first colored material in the first crack of the slab may include a first spray bar having a plurality of nozzles fixed thereto, arranged in a substantially straight line. In at least one embodiment, the apparatus may also include a device which moves a second portion of the slab out of alignment with the majority of the slab and thereby introduces a second crack in the slab.

8 Claims, 8 Drawing Sheets

(56) References Cited

U.S. PATENT DOCUMENTS

| | | | |
|---|---|---|---|
| 3,318,984 A | | 5/1967 | Dussel |
| 4,013,616 A | | 3/1977 | Wallace |
| 4,209,486 A | | 6/1980 | Ross |
| 4,343,752 A | | 8/1982 | Cann |
| 4,540,037 A | * | 9/1985 | Langner ............. B22D 11/0455 164/263 |
| 4,623,561 A | * | 11/1986 | Groothuizen ...... B22D 11/1233 29/81.08 |
| 5,266,253 A | | 11/1993 | Dijkhuizen |
| 5,795,513 A | | 8/1998 | Austin |
| 5,885,503 A | | 3/1999 | Bordener |
| 6,389,666 B1 | * | 5/2002 | Grothe ................... B21B 45/08 29/81.03 |
| 6,517,915 B1 | | 2/2003 | Banus |
| 6,702,967 B2 | | 3/2004 | Overholt et al. |
| 7,815,827 B2 | * | 10/2010 | Cruz ....................... B28B 1/005 264/71 |
| 8,436,075 B2 | | 5/2013 | Buskila et al. |
| 8,702,886 B2 | | 4/2014 | Yaniv et al. |
| 9,186,819 B1 | | 11/2015 | Grzeskowiak, II |
| 9,718,303 B2 | | 8/2017 | Greskowiak, II et al. |
| 2004/0175514 A1 | | 9/2004 | Stiattesi |
| 2006/0101752 A1 | | 5/2006 | Sakai |
| 2012/0283384 A1 | | 11/2012 | Cox |
| 2014/0127450 A1 | | 5/2014 | Riman |
| 2016/0236984 A1 | | 8/2016 | Riman |

\* cited by examiner

APPARATUS AND METHOD FOR SPRAYING COLOR INTO CRACKS OF A MOVING FORMED QUARTZ SLAB TO CREATE VEINS IN AN ENGINEERED STONE

FIELD OF THE INVENTION

This invention relates to improved methods and apparatus concerning quartz slabs.

BACKGROUND OF THE INVENTION

Quartz is the second most abundant mineral in the Earth's crust and one of the hardest naturally occurring materials. One of its many uses is in "engineered stone". Engineered stone, including quartz, has become a common surfacing and countertop choice in many countries throughout the world. Its applications include kitchen and bathroom countertops, tables and desktops, floor tile, food service areas, wall cladding, and various other horizontal and vertical applications.

The production of engineered stone generally involves particulate materials such as ground quartz rock, crushed glass, rocks, pebbles, sand, shells, silicon, and other inorganic materials combined with polymers, binders, resins, colorants, dyes, etc. The particulate material(s) may be varying sizes ranging from four hundred mesh particle size to four mesh particle size with multiple materials of different sizes used simultaneously. The polymer may include agents to such as a binder, hardener, initiator, or combination of such. The particulate material(s) and polymers, binders, resins, colorants, dyes, etc. are then mixed resulting in a slightly damp mixture. This initial mixture may be processed through a crushing machine to reduce the size of the combined particles. The resultant, finer mixture may be poured into a supporting mold, tray, or other supporting structure. The mold or tray containing the damp mixture is then moved onto a conveyor belt with a backing sheet, then a processed damp "slab" is moved into a vacuum press machine to compress the material. The compressed material is then placed into a curing machine to be heated into a hardened quartz slab. After curing, the hardened slab is generally moved to a grinder to be grinded down to a desired thickness, followed by a polisher to finish the product.

Quartz based stone has many advantages over natural stone such as marble and granite. Compared to these natural stones quartz is harder, stronger, less water absorbent, and more resistant to staining, scratching, breakage, chemicals, and heat. One of the drawbacks of quartz is its perceived lack of natural, random looking veins and color patterns compared with natural stones. This invention addresses a method of producing a quartz based slab with single color patterns or multiple color patterns and/or veins.

SUMMARY OF THE INVENTION

In at least one embodiment, an apparatus is provided comprising a device which moves a first portion of a slab out of alignment with a majority of the slab and thereby introduces a first crack in the slab; and a device for spraying a first colored material into the first crack of the slab. The slab typically is in a soft, damp, and/or wet state when the first portion of the slab is moved out of alignment with the majority of the slab.

In at least one embodiment, the device which moves the first portion of the slab out of alignment with the rest of the slab includes a first lift bar. The device for spraying the first colored material in the first crack of the slab may include a first spray bar having a plurality of nozzles fixed thereto, with the plurality of nozzles of the first spray bar arranged in a substantially straight line.

In at least one embodiment, the apparatus may include a device which moves a second portion of the slab out of alignment with the majority of the slab and thereby introduces a second crack in the slab, while the first portion of the slab is out of alignment with the majority of the slab in response to the device which moves the first portion of the slab out of alignment with the majority of the slab. The apparatus may include a device for spraying a second colored material into the second crack of the slab, which differs from the device for spraying the first colored material into the first crack of the slab, such that the first colored material is configured to be sprayed into the first crack of the slab while the second colored material is sprayed into the second crack of the slab.

In at least one embodiment, the apparatus may also include a conveyor device; wherein the conveyor device is configured to move the slab over a least a portion of the device which moves the first portion of the slab out of alignment with the majority of the slab.

The conveyor device may be configured to move the slab over a least a portion of the device which moves the second portion of the slab out of alignment with the majority of the slab.

The device for spraying the first colored material in the first crack of the slab may include a first spray bar having a plurality of nozzles fixed thereto, with the plurality of nozzles of the first spray bar arranged in a substantially straight line. The device for spraying the second colored material in the second crack of the slab may include a second spray bar having a plurality of nozzles fixed thereto, with the plurality of nozzles of the second spray bar arranged in a substantially straight line.

The device which moves the first portion of the slab out of alignment with the majority of the slab may include a first lift bar; and the device which moves the second portion of the slab out of alignment with the majority of the slab may include a second lift bar.

In at least one embodiment, the apparatus may include a computer processor; and a computer memory; wherein the computer processor is programmed by software in the computer memory to control the device which moves the first portion of the slab out of alignment with the majority of the slab and thereby introduces the first crack in the slab; and the device for spraying the first colored material into the first crack of the slab.

A method is provided in at least one embodiment which may include moving a first portion of a slab out of alignment with a majority of the slab and thereby introducing a first crack in the slab; and spraying a first colored material into the first crack of the slab. The method may also include moving a second portion of a slab out of alignment with a majority of the slab and thereby introducing a second crack in the slab; and spraying a second colored material into the second crack of the slab; and wherein the second portion of the slab is moved out of alignment with the majority of the slab while the first portion of the slab is moved out of alignment with the majority of the slab.

The method may employ further method steps, and may employ structure as previously noted and as further noted in the present application.

DETAILED DESCRIPTION OF THE DRAWINGS

Figure 1:
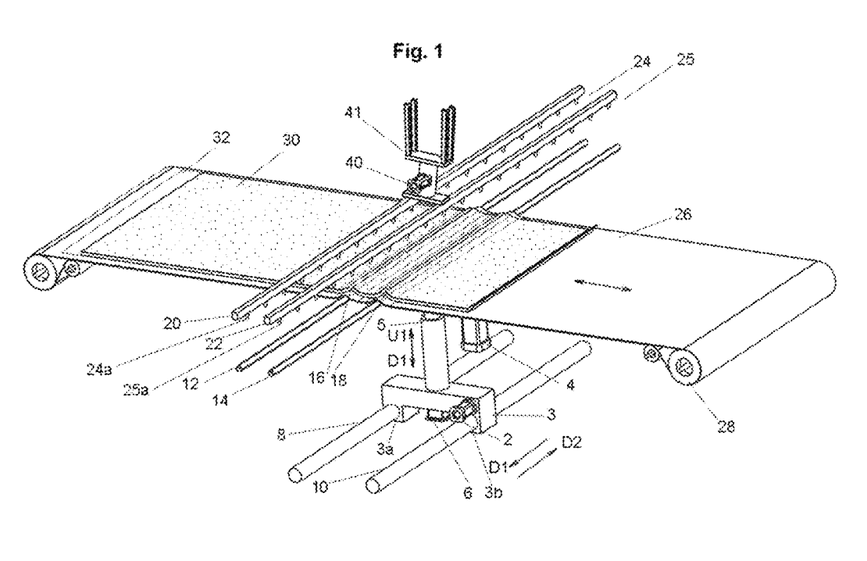
FIG. 1 shows a top, left, and front perspective view of an apparatus in accordance with an embodiment of the present invention, with the apparatus of FIG. 1, in a first state.

FIG. 1 shows a top, left, and front perspective view of an apparatus 1 in accordance with an embodiment of the present invention, with the apparatus of FIG. 1, in a first state. The apparatus 1 includes servo motor 2, servo motor 4, servo motor 6, rods or tracks 8 and 10, lift bars 12 and 14, spray bars 20 and 22, a plurality of nozzles 24, a plurality of nozzles 25, spray bar structure 41, spray bar rotation servo motor 40, conveyor belt 26, roller 28, formed quartz slab 30, and backing sheet 32. The formed quartz slab 30 in FIG. 1, is shown in a soft or damp form.

The apparatus 1 also includes U-shaped member 3, post 5, member 7, member 9, member 11, gear 13, and gear 15. The U-shaped member 3 may have openings 3a and 3b through which the rod or tracks 8 and 10 are inserted.

In operation, the U-shaped member 3 may be moved by the servo motor 2 to cause the U-shaped member 3 to slide in the directions D1 or D2, on the rods or tracks 8 and 10, while the rods or tracks 8 and 10 remain stationary.

In addition, the lift bars 12 and 14 and spray bars 20 and 22 together may be rotated to change their orientation with respect to the conveyor belt 26, with respect to the U-shaped member 3, and with respect to the conveyor belt length direction. For example, in FIG. 1, the conveyor belt 26 is shown perpendicular or substantially perpendicular to rods or tracks 8 and 10, and with respect to the direction arrows or directions D1 and D2, but lift bars 12 and 14 and spray bars 20 and 22 may be rotated (while the conveyor belt 26 remains stationary) to be at a different angle with respect to the rods or tracks 8 and 10, and with respect to the direction arrows or directions D1 and D2, and with respect to conveyor belt 26 or rotated to be parallel to the rods or tracks 8 and 10, and parallel to the direction arrows or directions D1 and D2.

Figure 3:
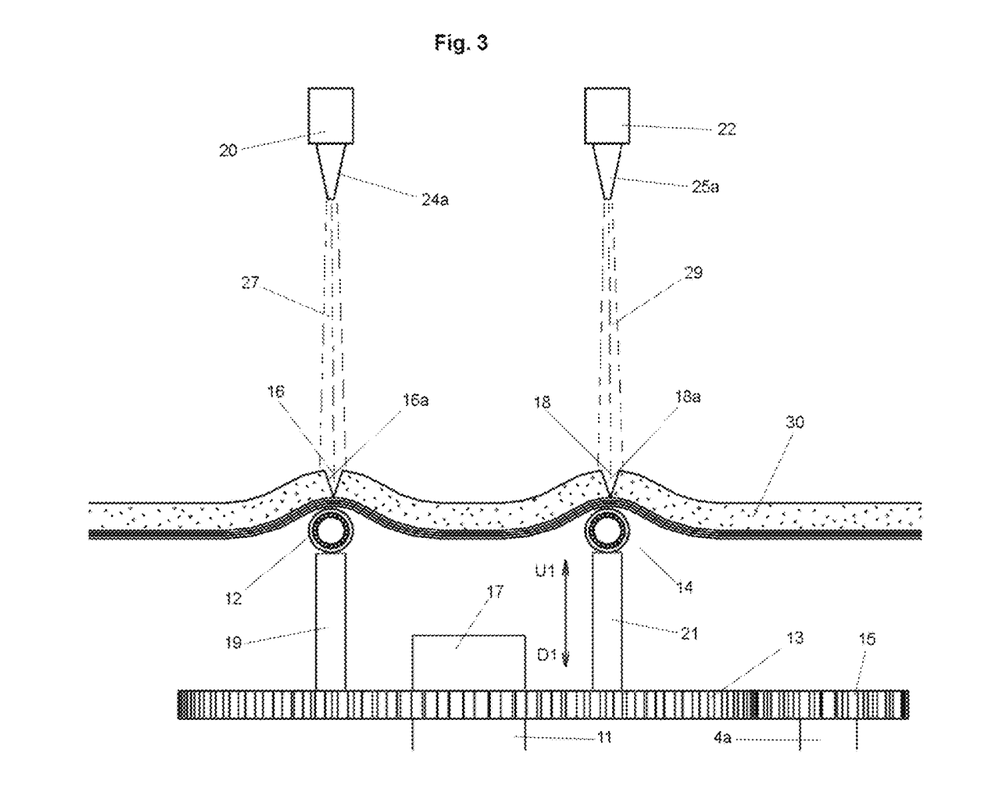
FIG. 3 shows a close up side view of a portion of the apparatus of FIG. 1, with the apparatus of FIG. 1 in the first state.

Also, the servo motor 6 can drive the lift bars 12 and 14 up and down in the directions U1 and D1, shown in FIG. 3, by driving members 7, 11, and 17 up and down to cause the members 19 and 21 to go up and down, and the attached lift bars 12 and 14 to go up and down in the directions U1 and D1, shown in FIG. 3.

The servo motor 4 can drive lift bars 12 and 14 and the servo motor 40 can drive spray bars 20 and 22 from zero to one hundred and eighty degrees, with respect to the conveyor belt 26. For example, in FIG. 1, the lift bars 12 and 14 and spray bars 20 and 22 are ninety degrees with respect to the length of the conveyor belt 26. The servo motor 4 can drive lift bars 12 and 14, the servo motor 40 can drive spray bars 20 and 22, to orient the components 12, 14, 20, and 22, parallel to the conveyor belt 26 (ninety degree rotation from FIG. 1), or at some other angle, or a one hundred and eighty degree rotation which causes ends 20a and 20b to swap locations and ends 22a and 22b to swap locations.

In at least one embodiment, colorant is sprayed onto a surface, and/or in the cracks of the surface, such as cracks 16 and 18 shown in FIG. 1, of the slab 30 through one or more of nozzles 24 and 25.

The conveyor belt 26 and the roller 28 may be part of an overall conveyor device, and the belt 26 and roller 28 may be driven by a motor not shown in FIG. 1.

Figure 2:
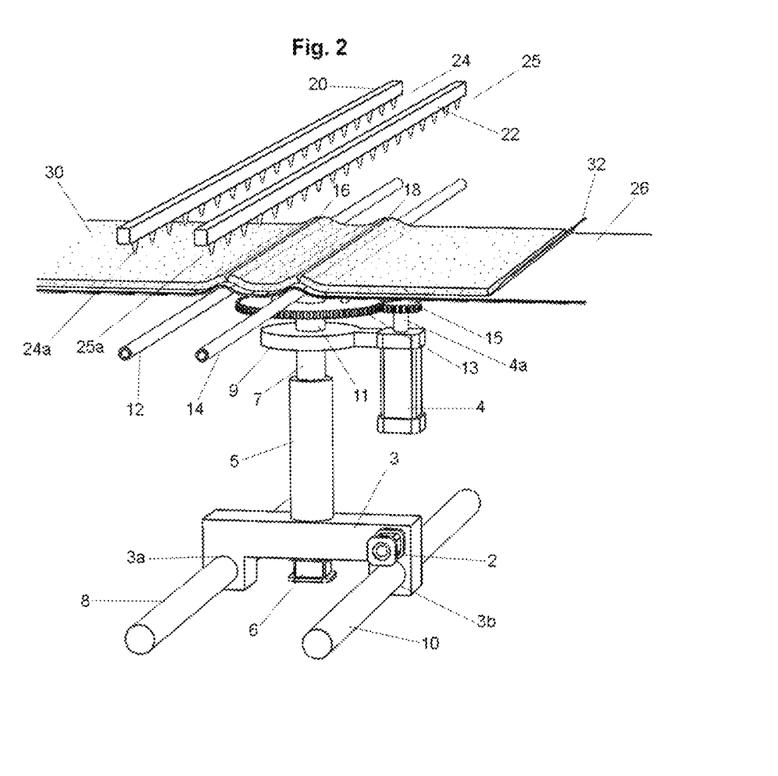
FIG. 2 shows a top, left, and front close up perspective view of a portion of the apparatus of FIG. 1, with part of the apparatus of FIG. 1 visible in FIG. 2, which is not visible in FIG. 1, with the apparatus of FIG. 1 in the first state.

FIG. 2 shows a top, left, and front close up perspective view of a portion of the apparatus 1 of FIG. 1, with part of the apparatus 1 of FIG. 1 visible in FIG. 2, which is not visible in FIG. 1, with the apparatus 1 of FIG. 1 in the first state.

FIG. 3 shows a close up side view of a portion of the apparatus 1 of FIG. 1, with the apparatus 1 of FIG. 1 in the first state.

Figure 4:
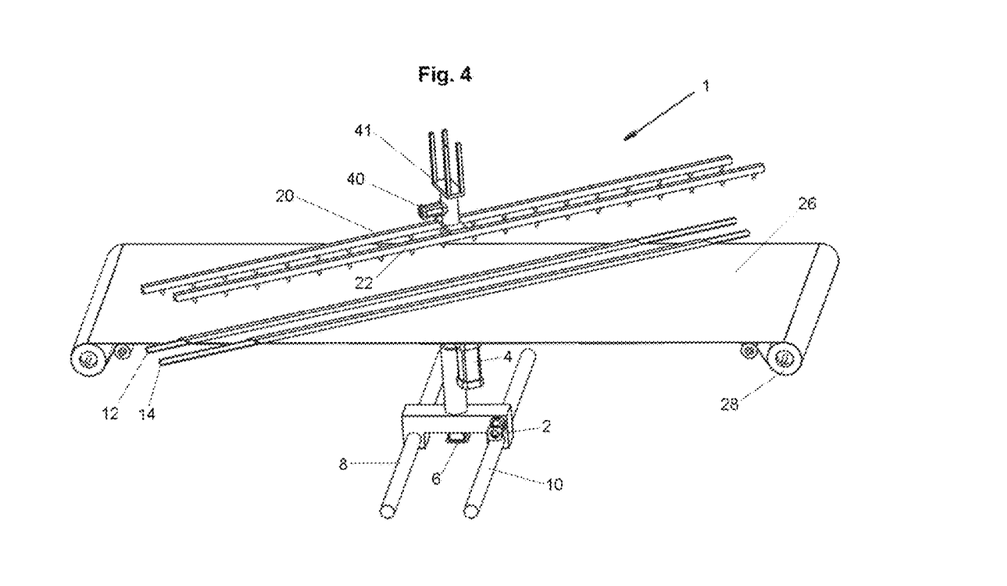
FIG. 4 shows a perspective view of the apparatus of FIG. 1, with the apparatus of FIG. 1 in a second state.

FIG. 4 shows a perspective view of the apparatus 1 of FIG. 1, with the apparatus 1 of FIG. 1 in a second state, in which the lift bars 12 and 14, together with the spray bars 20 and 22 have been driven to be at a substantial longitudinal angle with respect to the conveyor belt 26 by the servo motor 4 and servo motor 40.

Figure 5:
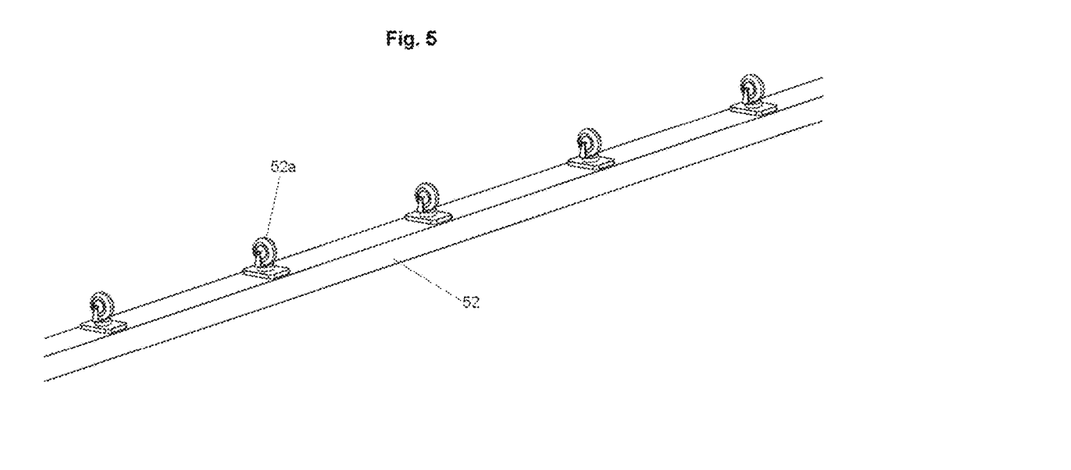
FIG. 5 shows a caster railing which can be used instead of a lift bar in the apparatus of FIG. 1.
Figure 6:
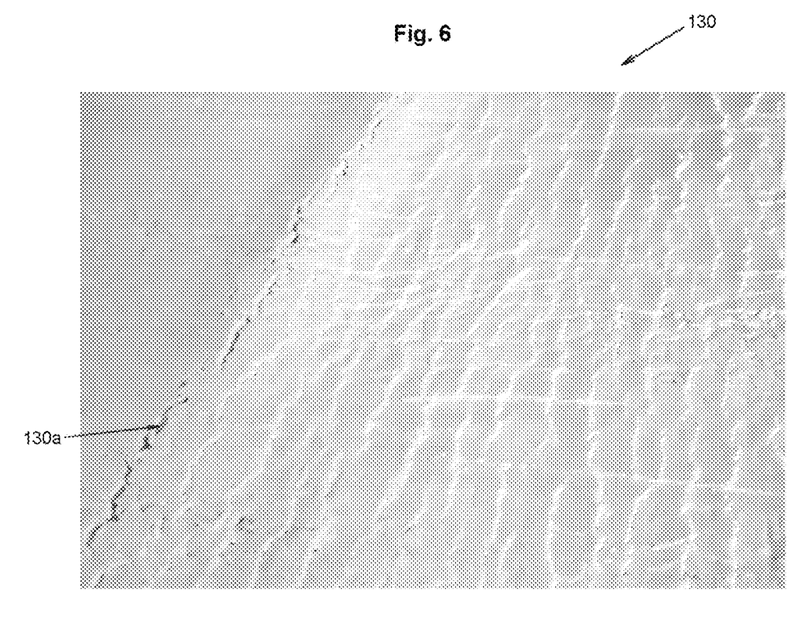
FIG. 6 shows image of a slab with a crack formed in accordance with an embodiment of the present invention.

FIG. 5 shows a caster railing which can be used instead of a lift bar in the apparatus of FIG. 1;

FIG. 6 shows an image of a soft or damp slab 130 (which may be similar to or identical to the slab 30 of FIG. 1) with a crack 130a formed in accordance with one or more embodiments of the present invention.

Figure 7:
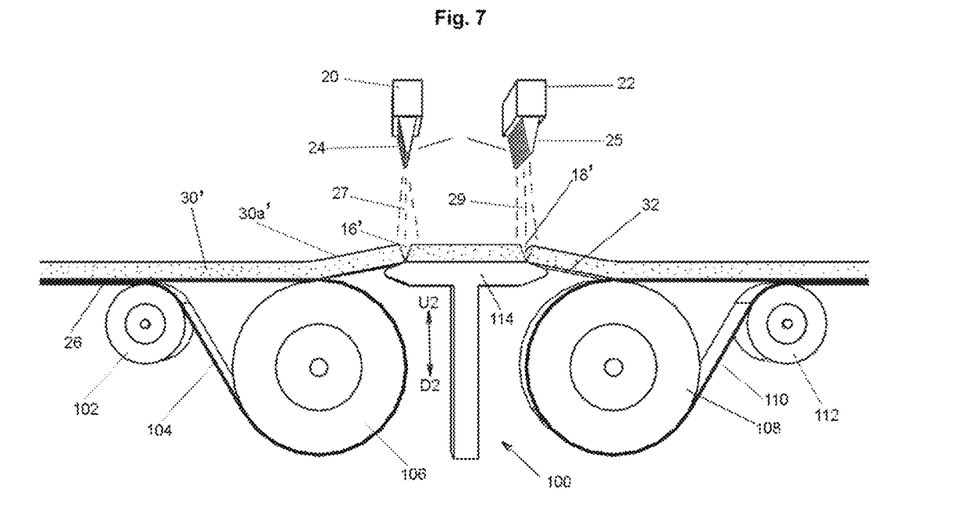
FIG. 7 shows side view wherein someone of the components of the apparatus of FIG. 1, have been replaced.

FIG. 7 is a side view, wherein the components 2, 3, 4, 6, 7, 8, 9, 10, 11, 12, 13, 14, 15, 17, 19, and 21 have been removed and replaced by an apparatus 100 including component 114 which can be adjusted upwards in the U2 direction or downwards in the D2 direction to set at a different height level with respect to surface level of belt 26. This can also cause the passing through quartz slab surface 30a' to crack at a different height point, but the crack lines generally only occur in a direction perpendicular to the conveyor belt moving direction. In FIG. 7, the slab is identified as slab 30', the slab surface as 30a', the cracks as 16' and 18', because the cracks 16' and 18' will be somewhat different from the cracks 16 and 18, and therefore the slab 30' and the slab surface 30a' will be somewhat different from the soft and/or damp and/or wet slab 30 and surface 30a shown in FIG. 1.

In at least one embodiment, the long lift bars 12 and 14 can be driven up in the direction U1, shown in FIG. 3, by servo motor 6 to push up the section of the conveyor belt 26 while a formed soft and damp quartz slab 30 passes through on the conveyor belt 26, causing the quartz slab surface at the points 16 and 18, above the lift bars 12 and 14, respectively, to crack, along the length direction of the lift bars 12 and 14.

Each of the spray bars 20 and 22 contains a series of spray nozzles, 24 and 25, respectively, positioned above the passing quartz slab 30 on the belt 26, controlled by a computer processor 202, and will send bursts of colorant 27 and 29, shown in FIG. 3, onto the cracks 16 and 18 of the quartz slab 30.

In at least one embodiment, the spray bars 20 and 22 are always in a fixed orientation with respect to the lift bars 12 and 14 so that the spray bar 20 is always right above lift bar 12 and the spray bar 22 is always right above left bar 14, driven by servo motor 4 and 40, controlled by computer processor 202.

Generally, in at least one embodiment, if the lift bars 12 and 14 are rotated to a certain degree by servo motor 4, the servo motor 40 is programmed to rotate spray bars 22 and 24 to exactly the same degree in order to line up components 12, 14 with 22, 24, as shown, for example, in FIG. 4, so that in this way, when spraying occurs the color can get into the cracks, such as cracks 16 and 18 as shown in FIG. 3. Generally, it is critical, in at least one embodiment, that components 12, 14 and 22, 24 be controlled, such as by computer processor 202 to be at the same orientation, such as shown in FIG. 4, in order to position spray bar 20 directly above and aligned with lift bar 12, and spray bar 22 directly above and aligned with lift bar 14, so that the series of nozzles 24 directly above lift bar 12, and the series of nozzles 25 directly above lift bar 14 can spray color material, down into cracks caused by lift bars 12 and 14. If spray bar 20 is not aligned with lift bar 12 and spray bar 22 is not aligned with lift bar 14, most of the color material will be sprayed outside of the cracks.

In addition, generally speaking as shown by FIG. 3, cracks 16 and 18 typically occur, in at least one embodiment, when the portion of the slab 30 passes through a different height level, such as for example measured from gear or component 13. Due to lift bar 12, a first portion of the slab 30 is moved upwards out of alignment with the majority of the slab 30. Due to lift bar 14, a second portion of the slab 30 is move upwards out of alignment with the majority of the slab 30, at the same time that the first portion of the slap 30 is moved out of alignment with the majority of the slab 30. After that portion of the slab 30 passes through that different height level, for example after a portion of the slab 30 passes lift bar 12, the crack 16 will close. Similarly after a portion of the slab 30 passes lift bar 14, the crack 18 will close. The spraying color material into the cracks 16 and 18, generally is programmed to occur when the cracks 16 and 18 occur, not after.

In at least one embodiment of the present invention, a different height level causes a a portion of a formed quartz slab surface 30a to crack at a different height level point, while a crack exists, color material is sprayed into the cracks, such as 16 and 18. The spraying of color material can be done by a human with a spray gun, or by a spray bar or bars, such as 20 and 22, as described in this invention, or by robot with a way to detect crack area and spray into cracks.

In addition, the direction of crack lines, such as lines 16 and 18 can be controlled by the rotatable lift bars 12 and 14 in one or more embodiments of the present invention.

The lift bars 12 and 14 are sitting on top of members 19 and 21, which are connected to gear 13, and which can cause the lift bars 12 and 14 to rotate to a certain direction as desired, from zero to one hundred eighty degrees, driven by a servo motor 4 and controlled by the computer 202. The lift bars 12 and 14 can be raised when cracks in certain area of the surface of a passing through quartz slab on belt are needed, and at the same time when the cracks occur, the colorant is sprayed into the cracks, such as shown for cracks 16 and 18, with colorant 27 and 29 shown in FIG. 3, controlled by computer processor 200.

In general, the higher the lift bars 12 and 14 are raised, the wider the cracks 16 and 18 on the surface of 30a of the passing through quartz slab 30 will be, and therefore when sprayed, the deeper the colorant 27 and 29 on the inner walls, such as 16a and 18a of the cracks 16 and 18, will penetrate, and the denser of the colorant 27 and 29 on walls, such as 16a and 18a of cracks 16 and 18 will be. I.e. typically more penetration means darker and deeper crack veins.

When a substantial longitudinal direction (along the length of the slab 30) crack veins in a quartz slab are needed, the bars 12 and 14 are rotated to that orientation, such as shown in FIG. 4, and the bar structure, including bars 12 and 14, can be moved on tracks or rods 8 and 10, so it can be moved in and out underneath the conveyor belt 26 to be positioned at desired area. If more crack lines are needed in the longitudinal direction, the conveyor belt 26 can be stopped, in response to the computer processor 202, and the lift bar structure, including bars 12 and 14, can continue to move on tracks 8 and 10 to a desired area and colorant can be sprayed into cracks above the lift bars in the manner previously described.

Lift bars 12 and 14 can be equipped with bearings, so it can have less resistance when raised against the moving conveyor belt 26. For example, in FIG. 5, a caster railing 52 can be used as a lift bar, instead of lift bar 12, to achieve the same result. In such an embodiment, the circular cross section of the caster wheel 52a of the caster railing 52 can be replaced in substituted in FIG. 3 for the circular cross section of the bar 12.

FIG. 7 shows an apparatus 100 which replaces various components shown in FIG. 3. The apparatus 100 may include a junction plate 114, a first belt structure including belt 104 and rollers 102 and 106, and a second belt structure including belt 110, and rollers 108 and 112. By adjusting the junction plate 114, up and down in the directions U2 and D2 between two separate belt structures different height levels with respect to the surface level of a moving conveyor belt 26, this also causes, in at least one embodiment, the passing through formed quartz slab surface 30a above the junction plate 114 area to crack, but the crack lines are substantially only in the cross direction of the moving belts 104 and 110 or moving quartz slab 30. Any height difference may cause the passing through slab 30 surface to crack at the height different point, and colorant may be sprayed into the cracks 16' and 18' at the same time.

FIG. 4 shows lift bars 12 and 14 and spray bars 20 and 22 in a diagonal orientation with respect to a length of the conveyor belt 26, wherein the conveyor belt 26 has a width which is substantially less than its length.

Once the entire formed quartz slab passed the lift bar area and desired area of crack lines created and colorant sprayed into the desired section of the (the on-off of all nozzles on the spray bars 20 and 22 can be controlled separately if needed) cracks, the quartz slab 30 is transferred to a vacuumed press machine. When the press machine is lowered onto the quartz composite material 30, the cracks 16 and 18 (or 16' and 18') sprayed with colorant will become lines of the colorant in the quartz slab that simulate veins in natural stone on the surface of the slab after the slab 30 has been cured, grinded, and polished.

Figure 8:
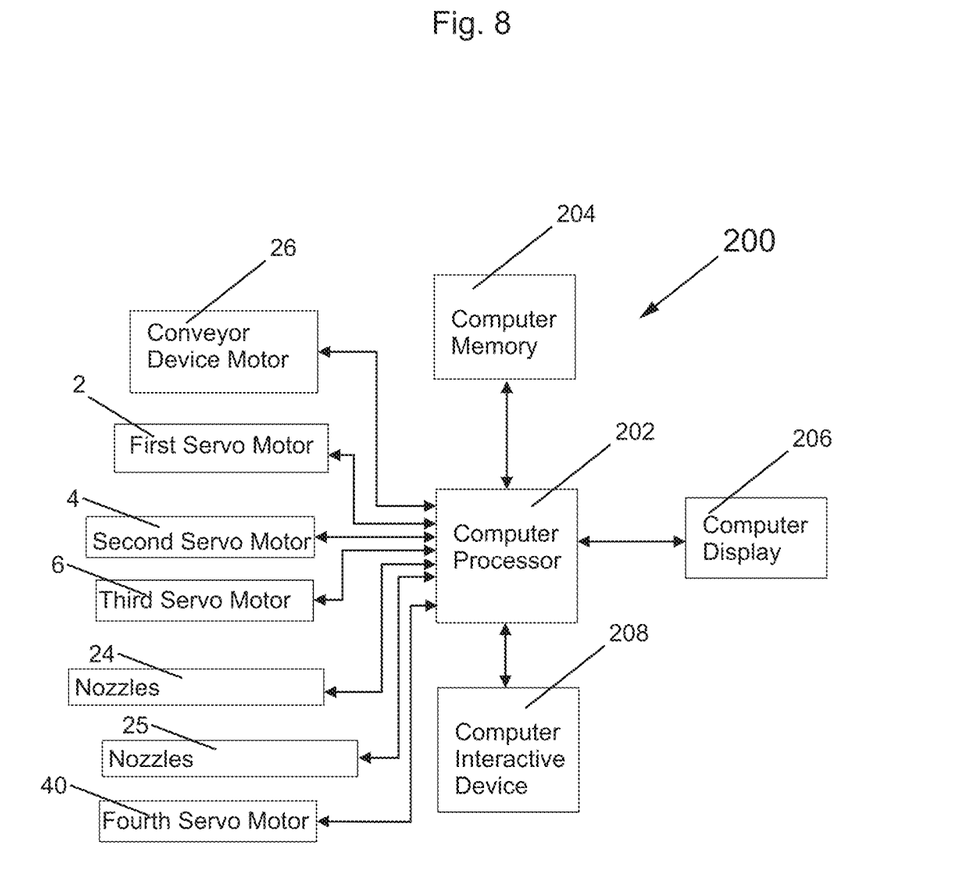
FIG. 8 shows a simplified block diagram of a computer processor and components which communicate with and/or are controlled by the computer processor.

FIG. 8 shows a simplified block diagram 200 including a computer processor 202 and components communicating with and/or controlled by the computer processor 202.

Referring to FIG. 8, the diagram 200, shows a computer processor 202, a computer memory 204, a computer display 206, a computer interactive device 208 (such as a computer mouse, touchscreen, or computer keyboard), and in simplified block diagram form, the conveyor device motor for conveyor belt 26, the first servo motor 2, the second servo motor 4, the third servo motor 6, the nozzles 24, and the nozzles 25. The computer processor communicates with and controls the components 26, 2, 4, 6, 24, and 25, as well as components 204, 206, and 208.

In operation, the computer processor 202 is programmed by computer software stored in the computer memory 204, and/or controlled by the computer interactive device 208 to control the components 26, 2, 4, 6, 24, 25, 24*a*, and 25*a*.

In one or more embodiments, spray bars 20 and 22 may be replaced by a human hand with a spray gun, in order to add randomness in missing some of the crack area, wherein said randomness may be desired. In other embodiments, a robot sprayer with a photo sensor may replace spray bars 20 and 22, wherein the photo sensor is used to spot or detect cracks and spray in the cracks as desired. There may be other ways to spray into the cracks.

Even though the rotation of the lift bars 12 and 14 are shown in one or more embodiments, as driven by servo motor 4 and controlled by computer processor 202, in alternative embodiments, the rotation of lift bars 12 and 14 can occur by hand.

Even though the up and down movement of FIG. 1, of the member 7 in FIG. 2 is driven by servo motor 6 and controlled by the computer processor 202 in one or more embodiments, in alternative embodiments, the up and down movement of the member 7 can be implemented manually, such as by a hand jack.

Even though the device including member 3, move in directions D1 and D2, in at least one embodiment, as shown in FIG. 1, driven by servo motor 2 and controlled by the computer 202, the member 3, and components fixed thereto can be rolled in the directions D1 and D2, shown in FIG. 1, in alternative embodiments by hand.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
   a device which moves a first portion of a slab out of alignment with a majority of the slab and thereby introduces a first crack in the slab;
   a device for spraying a first material having a color into the first crack of the slab, so that the first crack sprayed with the first material becomes a line having the color of the first material;
   a device which moves a second portion of the slab out of alignment with the majority of the slab and thereby introduces a second crack in the slab, while the first portion of the slab is out of alignment with the majority of the slab in response to the device which moves the first portion of the slab out of alignment with the majority of the slab;
   and a device for spraying a second material having a color into the second crack of the slab, so that the second crack sprayed with the second material becomes a line having the color of the second material; and
   wherein the apparatus is configured so that the device which moves the first portion of the slab moves the first portion in a first direction and the device which moves the second portion of the slab moves the second portion of the slab in the first direction, while the first portion of the slab is being moved in the first direction; and further comprising
   a computer processor; and
   a computer memory;
   wherein the computer processor is programmed by software in the computer memory to control the device which moves the first portion of the slab; the device which moves the second portion of the slab; the device for spraying the first material into the first crack of the slab, and the device for spraying the second material into the second crack of the slab.

2. The apparatus of claim 1 wherein
   the first material and the second material have the same color.

3. The apparatus of claim 1 wherein
   the device which moves the first portion of the slab out of alignment with the rest of the slab includes a first lift bar, and the device which moves the second portion of the slab out of alignment with the rest of the slab includes a second lift bar.

4. The apparatus of claim 1 wherein
   the device for spraying the first material into the first crack of the slab includes a first spray bar having a plurality of nozzles fixed thereto, with the plurality of nozzles of the first spray bar arranged in a substantially straight line; and
   wherein the device for spraying the second material into the second crack of the slab includes a second spray bar having a plurality of nozzles fixed thereto, with the plurality of nozzles of the second spray bar arranged in a substantially straight line.

5. The apparatus of claim 1 wherein
   the device for spraying the first material into the first crack of the slab includes a first spray bar having a plurality of nozzles fixed thereto, with the plurality of nozzles of the first spray bar arranged in a substantially straight line;
   the device for spraying the second material into the second crack of the slab includes a second spray bar having a plurality of nozzles fixed thereto, with the plurality of nozzles of the second spray bar arranged in a substantially straight line.

6. The apparatus of claim 1 wherein
   the device which moves the first portion of the slab out of alignment with the majority of the slab includes a first lift bar; and
   the device which moves the second portion of the slab out of alignment with the majority of the slab includes a second lift bar.

7. An apparatus comprising
   a junction plate which moves a first portion of a slab out of alignment with a majority of the slab and thereby introduces a first crack and a second crack in the slab;
   a device for spraying a first material having a color into the first crack of the slab, so that the first crack sprayed with the first material becomes a line having the color of the first material;
   a device for spraying a second material having a color into the second crack of the slab, such that the first material is configured to be sprayed into the first crack of the slab while the second material is sprayed into the second crack of the slab, and so that the second crack sprayed with the second material becomes a line having the color of the second material;
   a first roller which assists in moving the slab;
   a second roller which assists in moving the slab; and
   wherein the junction plate is located between the first and second rollers.

8. The apparatus of claim 7 further comprising
   a computer processor; and a computer memory; and wherein the computer processor is programmed by software in the computer memory to control the device for spraying the first material into the first crack of the slab, the device for spraying the second material into the second crack of the slab; the first roller; the second roller; and the junction plate.

* * * * *